United States Patent
Valk et al.

(10) Patent No.: US 8,675,683 B2
(45) Date of Patent: Mar. 18, 2014

(54) IMPLEMENTING END-TO-END CREDIT MANAGEMENT FOR ENHANCED LARGE PACKET REASSEMBLY

(75) Inventors: Kenneth M. Valk, Rochester, MN (US); Bruce M. Walk, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 960 days.

(21) Appl. No.: 12/764,175

(22) Filed: Apr. 21, 2010

(65) Prior Publication Data
US 2011/0261837 A1 Oct. 27, 2011

(51) Int. Cl.
*H04J 3/24* (2006.01)

(52) U.S. Cl.
USPC .......................................................... 370/473

(58) Field of Classification Search
USPC ......... 370/231, 252, 394, 236, 241, 254, 389, 370/392, 471, 473, 474, 469
See application file for complete search history.

(56) References Cited

U.S. PATENT DOCUMENTS

| | | | | |
|---|---|---|---|---|
| 5,396,490 A | * | 3/1995 | White et al. | 370/474 |
| 6,891,855 B2 | * | 5/2005 | Bruckman | 370/468 |
| 7,856,026 B1 | * | 12/2010 | Finan et al. | 370/412 |
| 2002/0055993 A1 | * | 5/2002 | Shah et al. | 709/223 |
| 2002/0191642 A1 | * | 12/2002 | Calvignac et al. | 370/474 |
| 2008/0267065 A1 | * | 10/2008 | Balakrishnan et al. | 370/230.1 |

* cited by examiner

*Primary Examiner* — Anh Ngoc Nguyen
(74) *Attorney, Agent, or Firm* — Joan Pennington (57) ABSTRACT

A method and circuit for implementing end-to-end credit management for enhanced large packet reassembly in an interconnect system, and a design structure on which the subject circuit resides are provided. A transport layer provides buffering and credit control for a super packet received from a source device. A source transport layer sends an End-to-End (ETE) credit request message to a destination transport layer for an outstanding super packet transmission to a destination device. The destination transport layer grants credit to allow at least one source to send a super packet to the destination. The source transport layer fragments the super packet into multiple packets and sends all packets of the super packet only responsive to the credit request being granted by the destination transport layer that is needed to send all packets of the super packet.

24 Claims, 11 Drawing Sheets

IMPLEMENTING END-TO-END CREDIT MANAGEMENT FOR ENHANCED LARGE PACKET REASSEMBLY

FIELD OF THE INVENTION

The present invention relates generally to the data processing field, and more particularly, relates to a method and circuit for implementing end-to-end credit management for enhanced large packet reassembly in an interconnect system, and a design structure on which the subject circuit resides.

DESCRIPTION OF THE RELATED ART

It is desirable to replace multiple interconnects, such as Ethernet, Peripheral Component Interconnect Express (PCIe), and Fibre channel, within a data center by providing one local rack interconnect system.

A local rack interconnect system is used to transfer packets from a source high bandwidth device, such as either a central processor unit (CPU) or an input/output (I/O) adapter, to a destination high bandwidth device, for example, either a CPU or I/O adapter, using one or more hops across lower bandwidth links in the interconnect system. The local rack interconnect system includes a source interconnect chip connected to the source high bandwidth device, such as either a central processor unit (CPU) or an input/output (I/O) adapter, and a destination interconnect chip connected to the destination high bandwidth device, for example, either a CPU or I/O adapter. The local rack interconnect system must be able to sustain the high bandwidth of the source and destination devices while maintaining low latency in transferring packets from the source device to the destination device.

When sending large packets over a local rack interconnect system that supports only smaller packet sizes, the large packets must be fragmented into small packets at the source and reassembled into large packets at the destination.

The destination must typically have buffer or memory space for the largest packet times the maximum number of sources that could send a packet to the destination. When the number of sources becomes large this memory space becomes expensive, for example, when provided on-chip.

A need exists for an effective method and circuit to implement end-to-end credit management in an interconnect system for enhanced large packet reassembly. It is desirable to provide such method and circuit that minimizes required memory space.

As used in the following description and claims, the term "super packet" should be understood to include a large packet received from a source device that must be fragmented into smaller packets to be transferred in a local rack interconnect system to a destination device.

SUMMARY OF THE INVENTION

Principal aspects of the present invention are to provide a method and circuits for implementing end-to-end credit management for enhanced large packet reassembly, and a design structure on which the subject circuit resides. Other important aspects of the present invention are to provide such method, circuitry, and design structure substantially without negative effect and that overcome many of the disadvantages of prior art arrangements.

In brief, a method and circuit for implementing end-to-end credit management for enhanced large packet reassembly in an interconnect system, and a design structure on which the subject circuit resides are provided. A transport layer provides buffering and credit control for a super packet received from a source device. A source transport layer sends an End-to-End (ETE) credit request message to a destination transport layer for an outstanding super packet transmission to a destination device. The destination transport layer grants credit to allow at least one source to send a super packet to the destination device. The transport layer fragments the super packet into multiple packets and sends all packets of a super packet only responsive to the credit request being granted by the destination transport layer that is needed to send all packets of the super packet.

In accordance with features of the invention, the source transport layer tags a first packet with a total size of the super packet, assigns ETE sequence numbers, and tags a last packet with a tail flag, sending all packets of the super packet to the destination transport layer. The destination transport layer receives the packets, buffers, and restores order of the received packets using ETE sequence numbers, checking for the last packet with the tail flag and all packets in the super packet. The destination transport layer transfers all packets of the super packet to the destination device only responsive to receiving all packets in the super packet.

In accordance with features of the invention, the destination transport layer grants credits that are used, and released by the source transport layer, or rescinded by the destination transport layer. The destination transport layer grants credits to each of multiple source transport layers, for example, using a round robin or weighted round robin granting of credits so that each source transport layer receives a fair chance to make forward progress, while enough credits are granted to a source transport layer for the super packet.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, circuits and methods are provided for implementing end-to-end (ETE) credit management for enhanced large packet reassembly in an interconnect system.

Figure 1A:
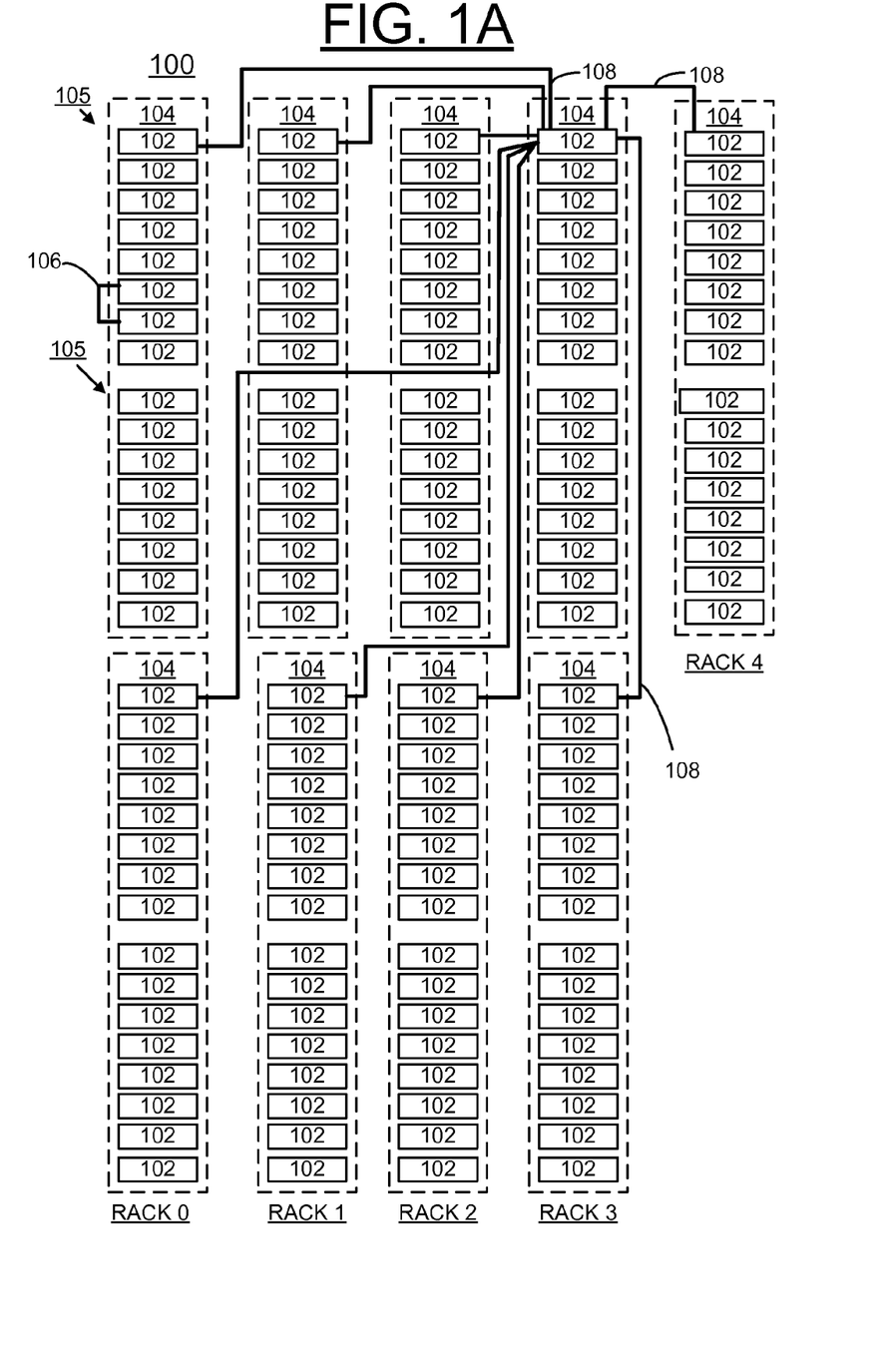
FIGS. 1A, 1B, 1C, 1D, and 1E are respective schematic and block diagrams illustrating an exemplary a local rack interconnect system for implementing end-to-end credit management for enhanced large packet reassembly in accordance with the preferred embodiment.

Having reference now to the drawings, in FIG. 1A, there is shown an example multiple-path local rack interconnect system generally designated by the reference character 100 used for implementing ETE credit management for enhanced large packet reassembly in accordance with the preferred embodiment. The multiple-path local rack interconnect system 100 supports computer system communications between multiple servers, and enables an Input/Output (IO) adapter to be shared across multiple servers. The multiple-path local rack interconnect system 100 supports network, storage, clustering and Peripheral Component Interconnect Express (PCIe) data traffic.

The multiple-path local rack interconnect system 100 includes a plurality of interconnect chips 102 in accordance with the preferred embodiment arranged in groups or super nodes 104. Each super node 104 includes a predefined number of interconnect chips 102, such as 16 interconnect chips, arranged as a chassis pair including a first and a second chassis group 105, each including 8 interconnect chips 102. The multiple-path local rack interconnect system 100 includes, for example, a predefined maximum number of nine super nodes 104. As shown, a pair of super nodes 104 are provided within four racks or racks 0-3, and a ninth super node 104 is provided within the fifth rack or rack 4.

In FIG. 1A, the multiple-path local rack interconnect system 100 is shown in simplified form sufficient for understanding the invention, with one of a plurality of local links (L-links) 106 shown between a pair of the interconnect chips 102 within one super node 104. The multiple-path local rack interconnect system 100 includes a plurality of L-links 106 connecting together all of the interconnect chips 102 of each super node 104. A plurality of distance links (D-links) 108, or as shown eight D-links 108 connect together the example nine super nodes 104 together in the same position in each of the other chassis pairs. Each of the L-links 106 and D-links 108 comprises a bi-directional (x2) high-speed serial (HSS) link.

Figure 1B:
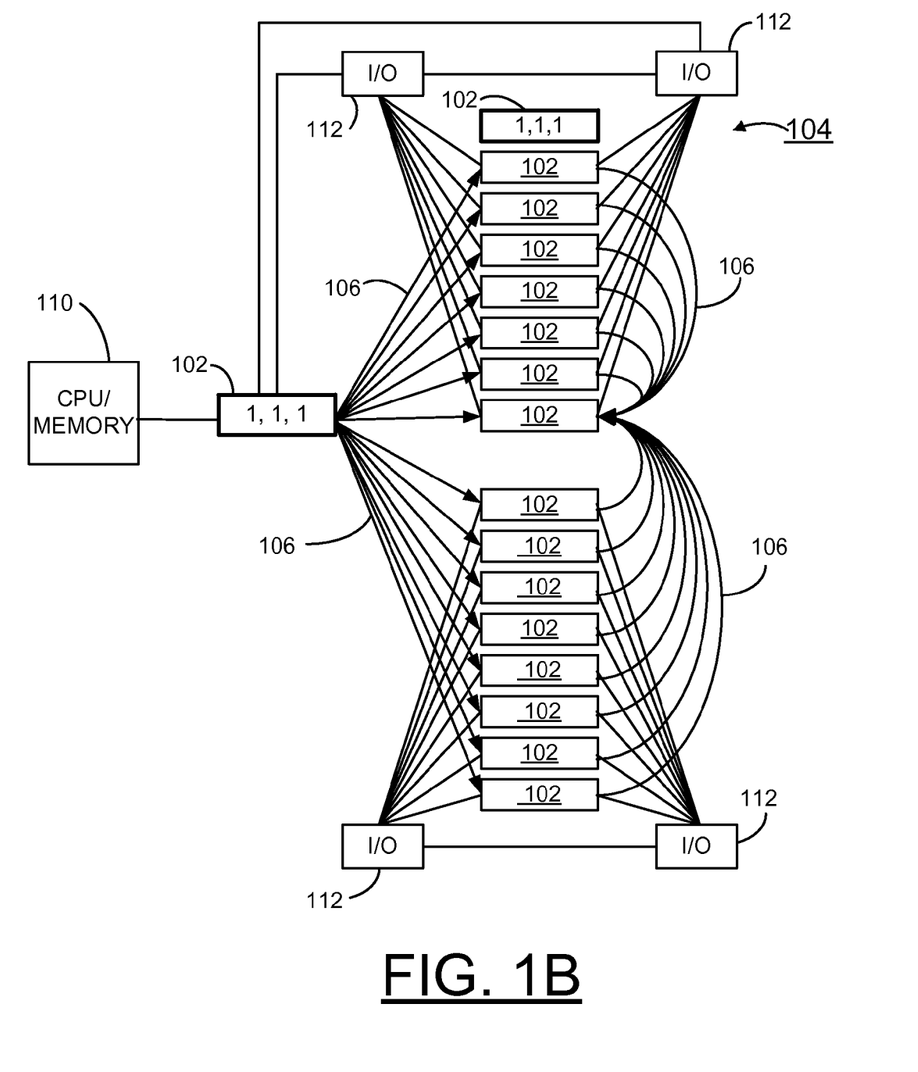
Figure 1C:
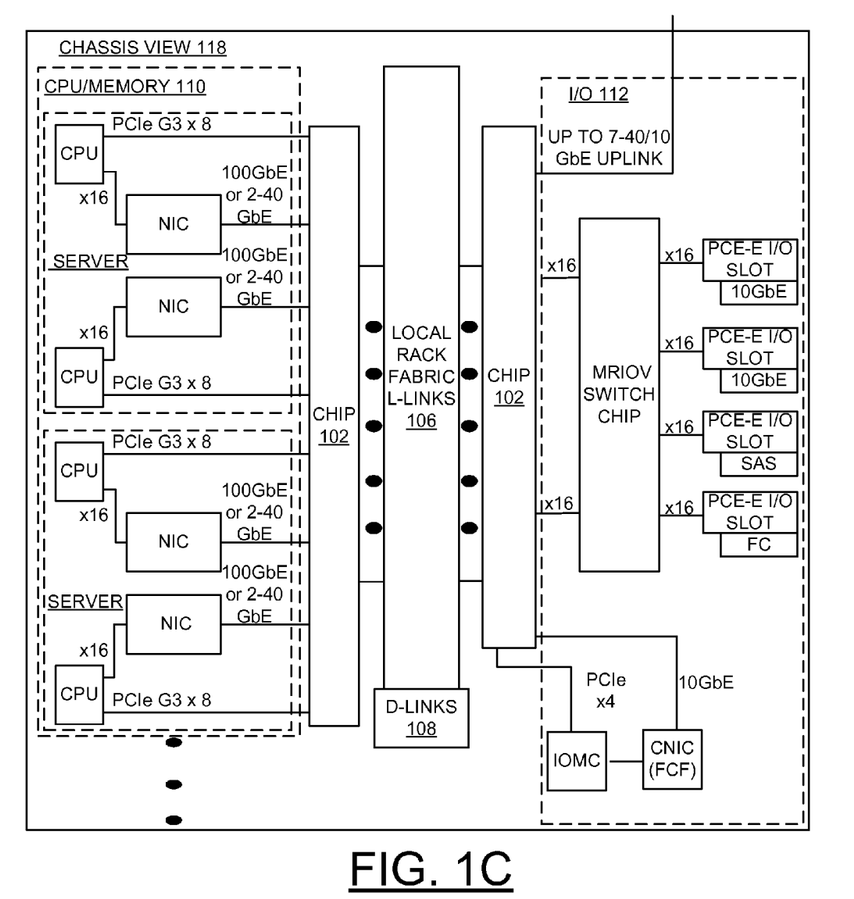
Figure 1D:
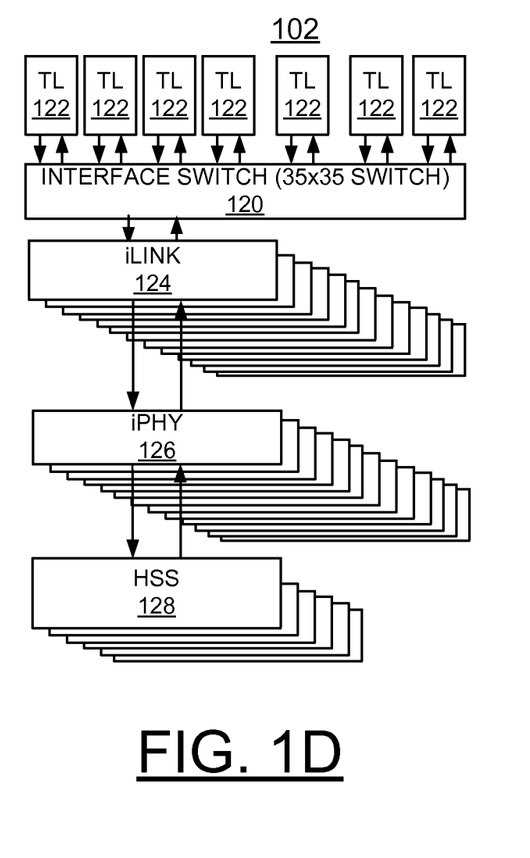
Figure 1E:
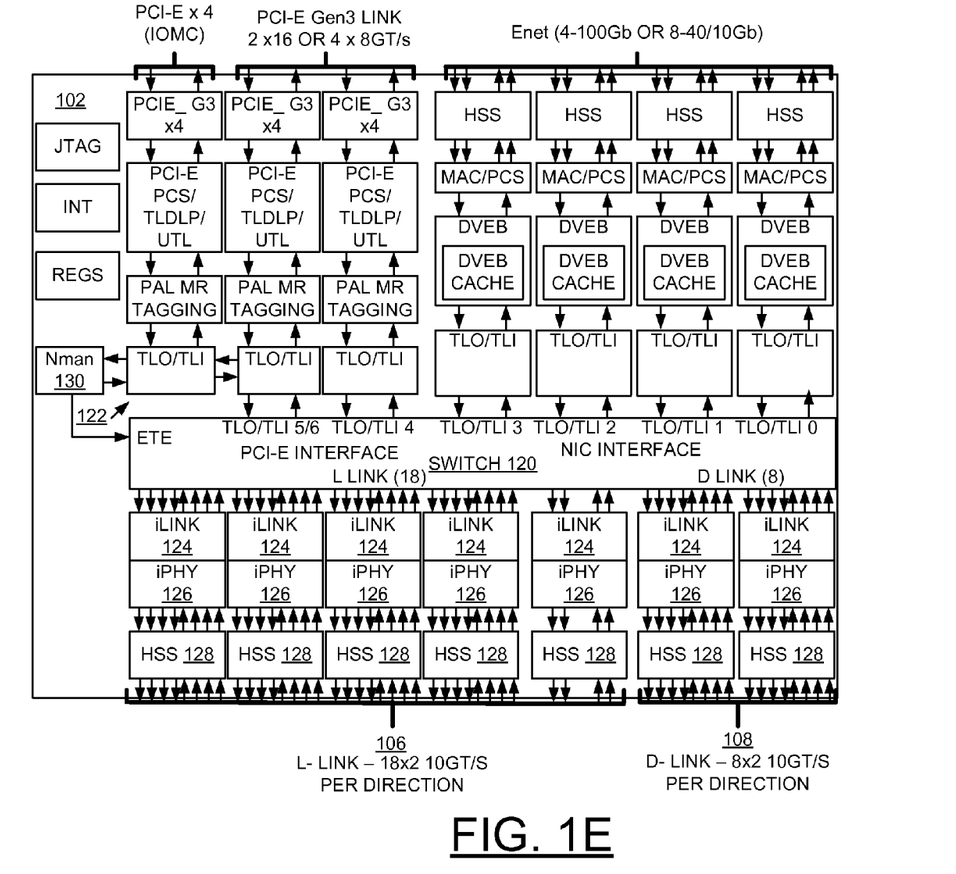

Referring also to FIG. 1E, each of the interconnect chips 102 of FIG. 1A includes, for example, 18 L-links 106, labeled 18 x2 10 GT/S PER DIRECTION and 8 D-links 108, labeled 8 x2 10 GT/S PER DIRECTION.

Referring also to FIGS. 1B and 1C, multiple interconnect chips 102 defining a super node 104 are shown connected together in FIG. 1B. A first or top of stack interconnect chip 102, labeled 1,1,1 is shown twice in FIG. 1B, once off to the side and once on the top of the stack. Connections are shown to the illustrated interconnect chip 102, labeled 1,1,1 positioned on the side of the super node 104 including a plurality of L-links 106 and a connection to a device 110, such as a central processor unit (CPU)/memory 110. A plurality of D links 108 or eight D-links 108 as shown in FIG. 1A, (not shown in FIG. 1B) are connected to the interconnect chips 102, such as interconnect chip 102, labeled 1,1,1 in FIG. 1B.

As shown in FIG. 1B, each of a plurality of input/output (I/O) blocks 112, is connected to respective interconnect chips 102, and respective ones of the I/O 112 are connected together. A source interconnect chip 102, such as interconnect chip 102, labeled 1,1,1 transmits or sprays all data traffic across all L-links 106. A local I/O 112 may also use a particular L-link 106 of destination I/O 112. For a destination inside a super node 104, or chassis pair of first and second chassis group 105, a source interconnect chip or an intermediate interconnect chip 102 forwards packets directly to a destination interconnect chip 102 over an L-link 106. For a destination outside a super node 104, a source interconnect chip or an intermediate interconnect chip 102 forwards packets to an interconnect chip 102 in the same position on the destination super node 104 over a D-link 108. The interconnect chip 102 in the same position on the destination super node 104 forwards packets directly to a destination interconnect chip 102 over an L-link 106.

In the multiple-path local rack interconnect system 100, the possible routing paths with the source and destination interconnect chips 102 within the same super node 104 include a single L-link 106; or a pair of L-links 106. The possible routing paths with the source and destination interconnect chips 102 within different super nodes 104 include a single D-link 108 (D); or a single D-link 108, and a single L-link 106 (D-L); or a single L-link 106, and single D-link 108 (L-D); or a single L-link 106, a single D-link 108, and a single L-link 106 (L-D-L). With an unpopulated interconnect chip 102 or a failing path, either the L-link 106 or D-link 108 at the beginning of the path is removed from a spray list at the source interconnect 102.

As shown in FIGS. 1B and 1C, a direct path is provided from the central processor unit (CPU)/memory 110 to the interconnect chips 102, such as chip 102, labeled 1,1,1 in FIG. 1B, and from any other CPU/memory connected to another respective interconnect chip 102 within the super node 104.

Referring now to FIG. 1C, a chassis view generally designated by the reference character 118 is shown with a first of a pair of interconnect chips 102 connected a central processor unit (CPU)/memory 110 and the other interconnect chip 102 connected to input/output (I/O) 112 connected by local rack fabric L-links 106, and D-links 108. Example connections shown between each of an illustrated pair of servers within the CPU/memory 110 and the first interconnect chip 102 include a Peripheral Component Interconnect Express (PCIe) G3 x8, and a pair of 100 GbE or 2-40 GbE to a respective Network Interface Card (NIC). Example connections of the other interconnect chip 102 include up to 7-40/10 GbE Uplinks, and example connections shown to the I/O 112 include a pair of PCIe G3 x16 to an external MRIOV switch chip, with four x16 to PCI-E I/O Slots with two Ethernet slots indicated 10 GbE, and two storage slots indicated as SAS (serial attached SCSI) and FC (fibre channel), a PCIe x4 to a IOMC and 10GbE to CNIC (FCF).

Referring now to FIGS. 1D and 1E, there are shown block diagram representations illustrating an example interconnect chip 102. The interconnect chip 102 includes an interface switch 120 connecting a plurality of transport layers (TL) 122, such as 7 TLs, and interface links (iLink) layer 124 or 26 iLinks. An interface physical layer protocol, or iPhy 126 is coupled between the interface links layer iLink 124 and high speed serial (HSS) interface 128, such as 7 HSS 128. As shown in FIG. 1E, the 7 HSS 128 are respectively connected to the illustrated 18 L-links 106, and 8 D-links 108. In the example implementation of interconnect chip 102, 26 connections including the illustrated 18 L-links 106, and 8 D-links 108 to the 7 HSS 128 are used, while the 7 HSS 128 would support 28 connections.

The TLs 122 provide reliable transport of packets, including recovering from broken chips 102 and broken links 106, 108 in the path between source and destination. For example, the interface switch 120 connects the 7 TLs 122 and the 26 iLinks 124 in a crossbar switch, providing receive buffering for iLink packets and minimal buffering for the local rack interconnect packets from the TLO 122. The packets from the TL 122 are sprayed onto multiple links by interface switch 120 to achieve higher bandwidth. The iLink layer protocol 124 handles link level flow control, error checking CRC generating and checking, and link level retransmission in the event of CRC errors. The iPhy layer protocol 126 handles training sequences, lane alignment, and scrambling and descrambling. The HSS 128, for example, are 7 x8 full duplex cores providing the illustrated 26 x2 lanes.

In FIG. 1E, a more detailed block diagram representation illustrating the example interconnect chip 102 is shown. Each of the 7 transport layers (TLs) 122 includes a transport layer out (TLO) partition and transport layer in (TLI) partition. The TLO/TLI 122 respectively receives and sends local rack interconnect packets from and to the illustrated Ethernet (Enet), and the Peripheral Component Interconnect Express (PCI-E), PCI-E x4, PCI-3 Gen3 Link respectively via network adapter or fabric adapter, as illustrated by blocks labeled high speed serial (HSS), media access control/physical coding sub-layer (MAC/PCS), distributed virtual Ethernet bridge (DVEB); and the PCIE_G3 x4, and PCIE_G3 2x8, PCIE_G3 2x8, a Peripheral Component Interconnect Express (PCIe) Physical Coding Sub-layer (PCS) Transaction Layer/Data/Link Protocol (TLDLP) Upper Transaction Layer (UTL), PCIe Application Layer (PAL MR) TAGGING to and from the interconnect switch 120. A network manager (NMan) 130 coupled to interface switch 120 uses End-to-End (ETE) small control packets for network management and control functions in multiple-path local rack interconnect system 100. The interconnect chip 102 includes JTAG, Interrupt Handler (INT), and Register partition (REGS) functions.

In accordance with features of the invention, protocol methods and transport layer circuits are provided for implementing End-to-End (ETE) credit management for enhanced large packet or super packet reassembly. End-to-End credit management is used to limit the buffer space needed for packet reassembly. A destination hands out credit such that only a bounded number of sources may send large packets or super packets to the destination. This allows large packets to be transmitted and reassembled without incurring the cost of providing a very large reassembly memory or buffer. It also allows most of the network only provide buffering and logic for the small packet size of the fragmented super packets.

In accordance with features of the invention, the transport layer provides buffering and credit control for a super packet received from the source device. A source transport layer sends an End-to-End (ETE) credit request message to a destination transport layer for an outstanding super packet transmission. The destination transport layer grants credit to allow a predefined number of sources to send super packets to the destination. The transport layer sends packets of a super packet only responsive to the credit request being granted by the destination transport layer that is needed to send all packets of the super packet.

Figure 2:
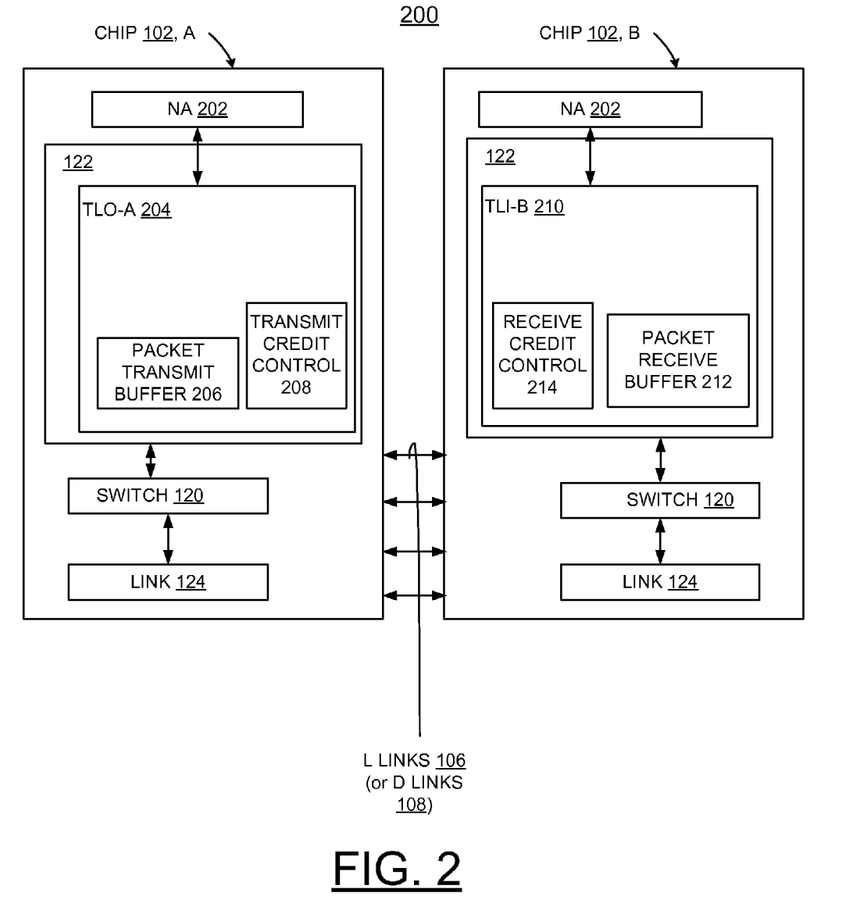
FIGS. 2 and 3 are respective schematic and block diagram illustrating circuits for implementing end-to-end (ETE) credit management for enhanced large packet reassembly in accordance with the preferred embodiment.

Referring now to FIG. 2, there is shown a circuit generally designated by the reference character 200 for implementing End-to-End (ETE) credit management for enhanced large packet reassembly in accordance with the preferred embodiment. Circuit 200 and each interconnect chip 102 includes a respective network adapter (NA) 202, such as a Peripheral Component Interconnect Express (PCIe)/Network Adapter PCIe/NA 202 included in an illustrated pair of interconnect chips 102 of a source interconnect chip 102, A and a destination interconnect chip 102, B connected by a plurality of L links 106, or connected by a plurality of D links 108 and L links 108. Circuit 200 and each interconnect chip 102 includes a transport layer 122 including a respective transport layer out (TLO)-A 204, and a respective transport layer in (TLI)-B, 210 as shown in FIG. 2.

Each TLO 204 includes a packet transmit buffer 206 providing packet buffering to a source device or application layers, such as, the NA 202. Each TLO 204 includes a transmit credit control 208 providing credit negotiation for End-to-End (ETE) credit management enabling enhanced large packet or super packet reassembly by the TLI 210 connected to a destination device. Circuit 200 and each interconnect chip 102 includes a switch 120 and a link layer 124.

Circuit 200 and each interconnect chip 102 includes a transport layer 122 including a respective transport layer in (TLI)-A 210, as shown in FIG. 2. Each TLI 210 includes a packet receive buffer 212 providing packet buffering connected to application layers, such as, the NA 202. Each TLI 210 includes a receive credit control 212 providing credit grants only for available buffer space 212 responsive to credit request messages.

In accordance with features of the invention, the TLI 210 of the destination transport layer 122 only grants credit sufficient to receive a super packet for buffer space 212 when the buffer space 212 is available. The TLO 204 of the source transport layer 122 never sends the packets of a super packet unless it has credit in the destination transport layer, then all packets are transmitted and stored in the destination transport layer buffer 212. The source transport layer TLO 204 fragments the super packet into multiple packets and sends all packets of a super packet only responsive to the credit request being granted by the destination transport layer that is needed to send all packets of the super packet.

The source transport layer TLO 204 tags a first packet with a total size of the super packet, assigns ETE sequence numbers, and tags a last packet with a tail flag, sending all packets of the super packet to the destination transport layer TLI 210. The destination transport layer TLI 210 receives the packets, buffers, and restores order of the received packets using ETE sequence numbers, checking for the last packet with the tail flag and all packets in the super packet. The destination transport layer TLI 210 transfers all packets of the super packet to the destination device only responsive to receiving all packets in the super packet.

In accordance with features of the invention, the destination transport layer TLI 210 grants credits that are used, and released by the source transport layer TLO 204, or rescinded by the destination transport layer TLI 210. The destination transport layer TLI 210 grants credits to each of multiple source transport layers TLO 204, for example, using a round robin or weighted round robin granting of credits so that each source transport layer receives a fair chance to make forward progress, while enough credits are granted to a source transport layer for the super packet. As a result, the method and circuit 200 of the invention minimizes required memory space.

The transmit credit control 208 sends a credit request to the receive credit control 212. The receive credit control 212 of the destination transport layer 122 sends a credit grant message to the transmit credit control 208. The credit request/grant messages and other small fixed-size end-to-end (ETE) acknowledge messages and other ETE messages are sent between the source transport layer 122 and the destination transport layer 122 through the respective switch 120 and link layers 124.

Figure 3:
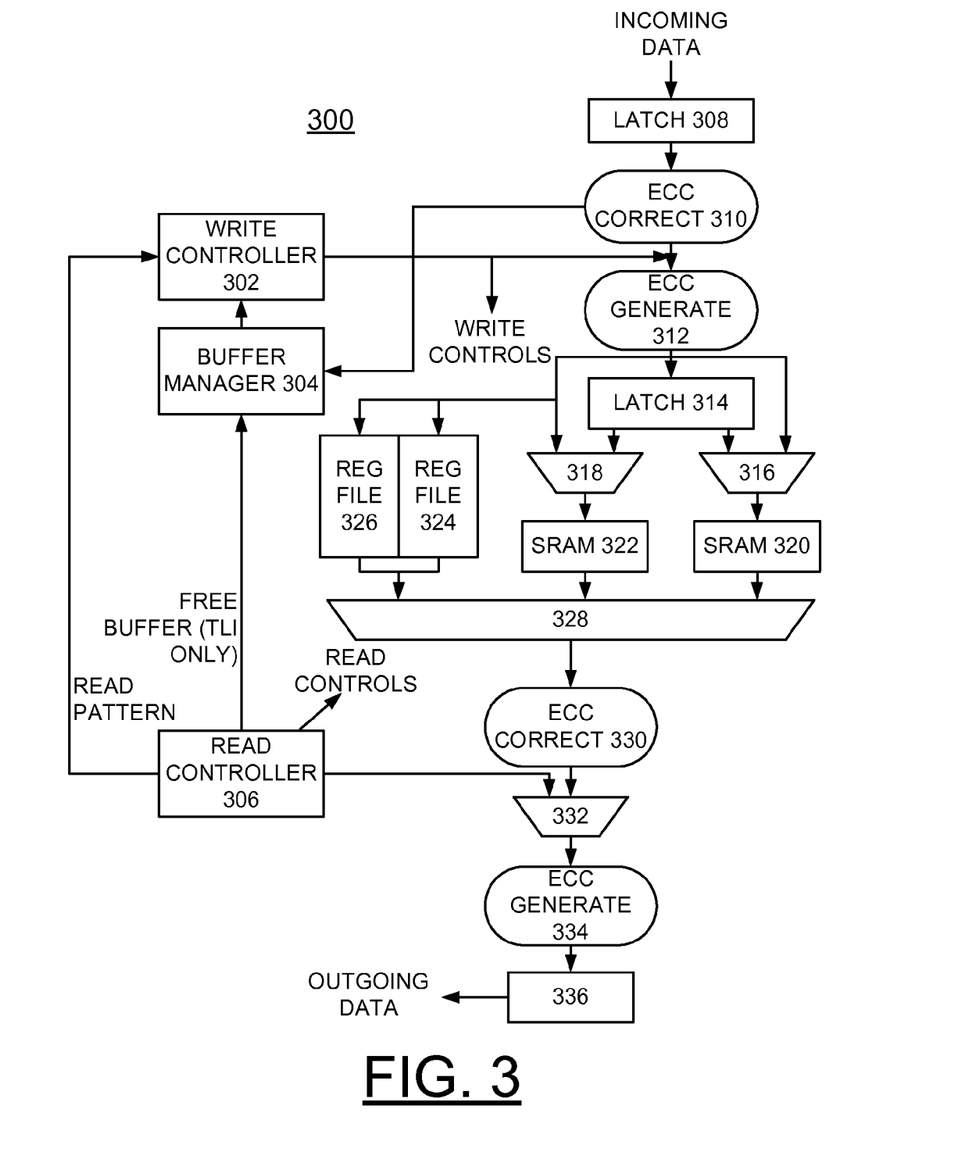

Referring now to FIG. 3, there is shown a transport layer circuit generally designated by the reference character 300 for implementing End-to-End (ETE) credit management for enhanced large packet reassembly in accordance with the preferred embodiment. The transport layer circuit 300 illustrates a TLO data and TLI data partition arrangement of the transport layer 122 for implementing end-to-end (ETE) credit management for enhanced large packet reassembly in accordance with the preferred embodiment.

The transport layer circuit 300 includes a write controller 302 providing write controls coupled to a buffer manager 304 and a read controller 306 coupled to the buffer manager 304 providing read controls. The transport layer circuit 300 receives incoming data coupled by a latch 308, such as a 36 byte latch 308 receiving 32-bytes of data and ECC. The output of latch 308 is connected to an error correcting code (ECC) checking and correction block 310, and an ECC generator 312 coupled to the write controller 302. The output of ECC generator 312 is coupled by a latch 314, and a pair of multiplexers 316, 318 to a first static random access memory 320 and a second static random access memory 322, such as 1-port SRAMs, and a first register file 324, and a second register file 326, such as a high performance 2-port RF2UD register file. A respective output of the pair of SRAMs 320, 322 and the register files 324, 326 are coupled to a data selector multiplexer 328. The transport layer circuit 300 includes an ECC checking and correction block 330 receiving the output of data selector multiplexer 328. The output of ECC correct 330 is coupled by a multiplexer 332 coupled to the read controller 304. The multiplexer output is applied to an ECC generator 334 coupled to latch 336, such as a 36 byte latch 336, providing outgoing data.

Figure 4:
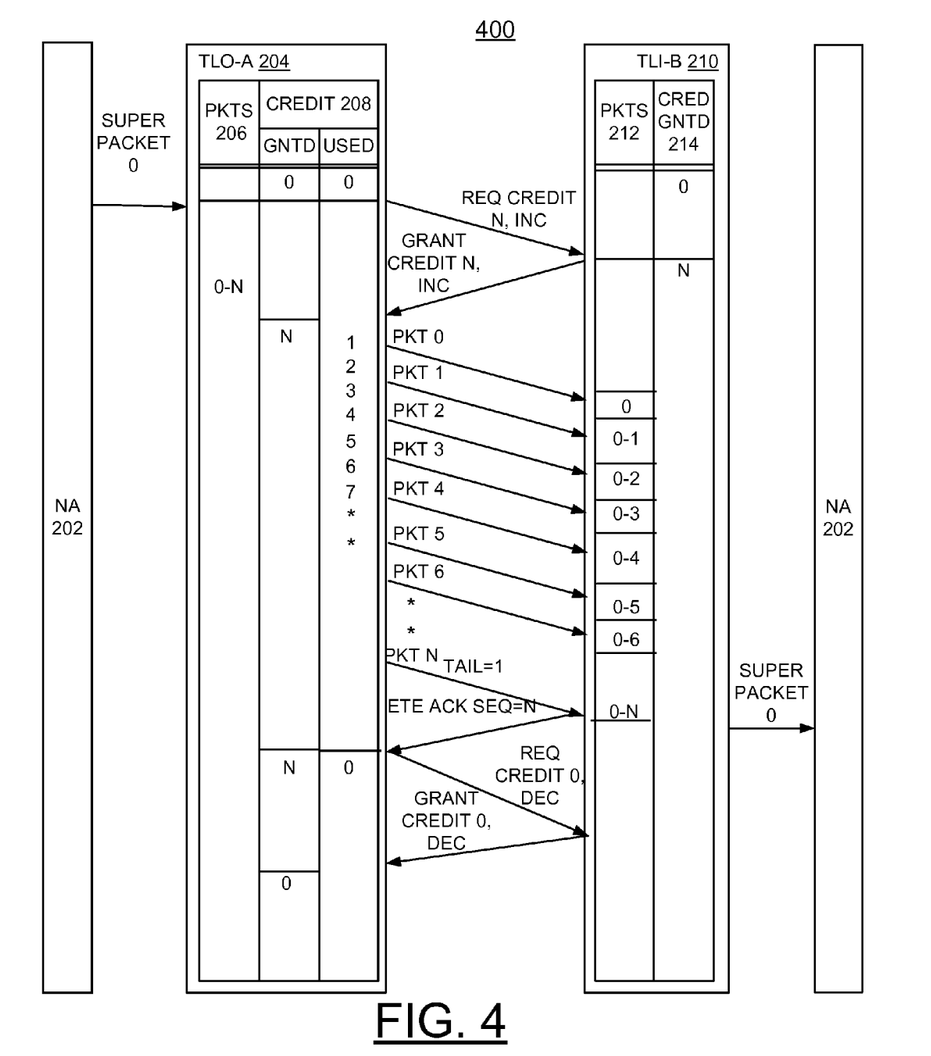
FIGS. 4, 5, and 6 are flow charts illustrating exemplary operations performed by the circuits of FIGS. 2 and 3 for implementing end-to-end credit management for enhanced large packet reassembly in accordance with the preferred embodiment.

Referring now to FIG. 4, there are shown exemplary operations generally designated by the reference character 400 performed by the circuit 200 in accordance with the preferred embodiment.

ETE credit management and data transfer operations 400 include a received data operations starting with a super packet 0 as indicated at a line SUPER PACKET 0 received by the TLO-A, 204 from the NA 202. Initially the transmit credit control 208 includes both zero (0) granted and used credits with the packet transmit buffer 206 storing fragmented small packets 0-N of SUPER PACKET 0. The transmit credit control 208 of source TLO-A 204 sends a request credit message to the receive credit control 214 of destination TLI-B 210 for a credit increase to N credits as indicated at a line labeled REQ CREDIT N, INC. The receive credit control 214 of destination TLI-B 210 sends a grant credit increase message of N credits when N credits are available as indicated at a line labeled GRANT CREDIT N, INC.

In response the source TLO-A 204 sends all packets 0-N of the super packet 0 from the packet transmit buffer 206 to the packet receive buffer 212 when a credit grant message is received responsive to the credit request message. After the grant credit increase message of N credits is received from the TLI-B 210, then N credits are available at transmit credit control. Then the source TLO-A 204 sends the stored small packets 0-N of SUPER PACKET 0 as indicated at a respective line labeled PKT 0, PKT 1, PKT 2, PKT 3, PKT 4, PKT 5, PKT 6, and PKT N, with the used credits increasing from 0 to N. The destination TLI-B 210 sends an end-to-end (ETE) acknowledgement message indicating N packets 0-N including the last packet with tail flag=1 of FRAME 0 have been received as indicated at a line labeled ETE ACK SEQ=N. The transmit credit control 208 of source TLO-A 204 sends a request credit decrease message to the receive credit control 214 of destination TLI-B 210 for a credit decrease to 0 credits as indicated at a line labeled REQ CREDIT 0, DEC. Alternatively the destination TLI-B 210 sends an ETE message to the source TLP-A to rescind or release credits without receiving the request credit decrease message. The receive credit control 214 of destination TLI-B 210 sends a grant credit decrease message of 0 credits responsive to the transmit credit control 208 of source TLO-A 204 sending the request credit decrease message as indicated at a line labeled GRANT CREDIT 0, DEC. Then the previously granted credits are available for a next credit request.

Alternatively the source TLO-A 204 may use the returned credits, if not rescinded by the destination TLI-B 210, to send a next super packet or packets responsive to the ETE acknowledge message instead of sending the request credit decrease message to the receive credit control 214 of destination TLI-B 210.

The destination TLI-B 210 having received the tail flag=1 and all packets 0-N of the SUPER PACKET 0, then sends the super packet to the NA 202.

Figure 5:
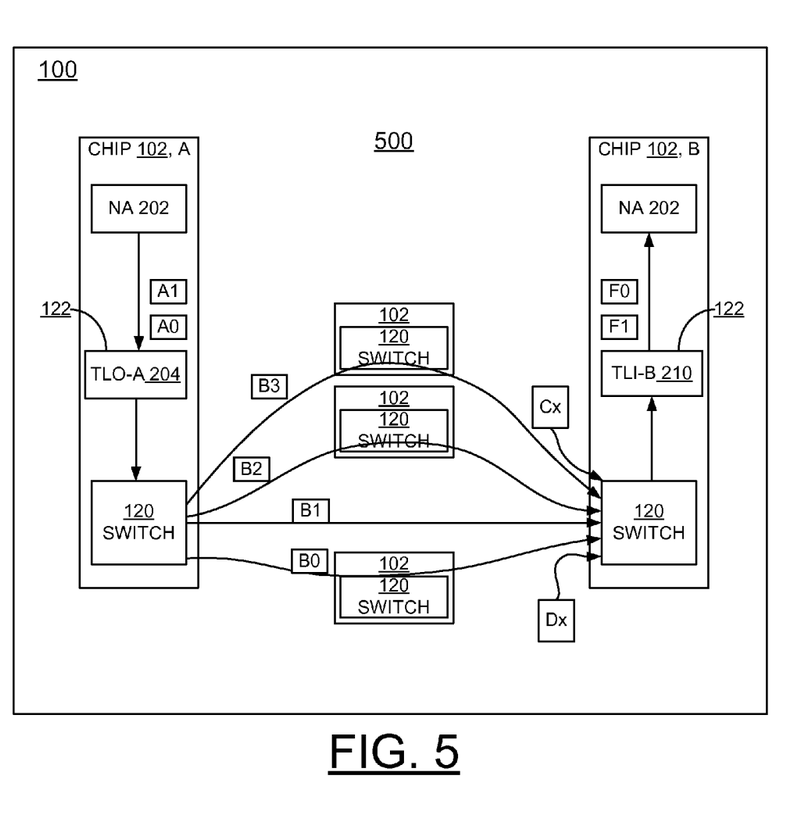

Referring now to FIG. 5, there are shown exemplary operations generally designated by the reference character 500 performed by the circuits 200, 300 for implementing End-to-End (ETE) credit management for enhanced large packet reassembly in accordance with the preferred embodiment. The illustrated enhanced data transfer operations 500 include packet transfer operations for transmitting packet of a pair of super packets A0, A1 that are received by source TLO-A 204 from the NA 202 of chip 102, A. Data transfer operations 300 illustrate packet transferred over multiple L links 106, or D links 108 and L links 106, within the local rack interconnect system 100. TLO-A, 204 uses multiple paths that are available for the destination interconnect chip 102, B, for example, identified by chip ID, and the TLO-A, 204 provides ports to the interconnect switch 120 that it can use to transfer packets. Paths are identified, for example by an exit port at the source interconnect chip 102.

TLO-A, 204 fragments the super packets A0, A1 into small packets and each small packet is assigned an End-to-End (ETE) sequence number in the source interconnect chip 102, A, and transferred on multiple paths as indicated by small packet labels B0, B1, B2, B3 with the multiple packets being transferred from a source chip 102, A to a destination chip 102, B. Blocks labeled Cx and Dx represent super packets from other sources. The destination TLI-B 210 waits until it has received the packet with the tail flag=1, and until it has all packets of the super packet identified by expected sequence number. Then the destination TLI-B 210 transfers all packets back-to-back of each entire super packet indicated by F0, F1 to the NA 202.

Figure 6:
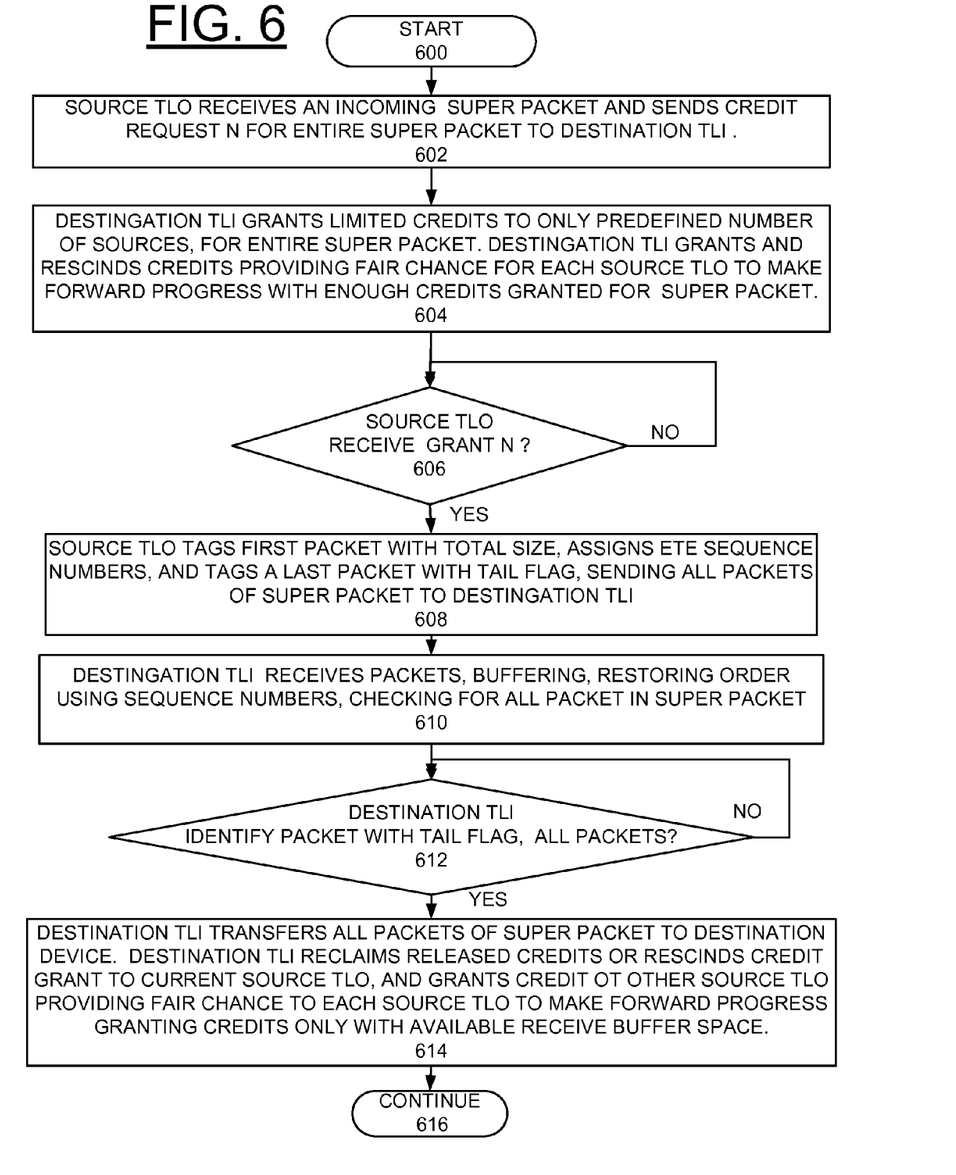

Referring now to FIG. 6, there are shown exemplary operations performed by the circuit 200 for implementing for implementing End-to-End (ETE) credit management for enhanced large packet reassembly in accordance with the preferred embodiment starting at a block 600. An incoming super packet is received from a source device by the source TLO and then the source TLO sends a credit request for N credits sufficient for the entire super packet to the destination TLI as indicated at a block 602. The destination transport layer grants credit to allow at least one source to send a super packet to the destination device, and grants and rescinds the credit requests to each of multiple source transport layers, for example, using a round robin or weighted round robin granting of credits so that each source transport layer receives a fair chance to make forward progress as indicated at a block 604. The source TLO checks for a credit grant from the destination TLI as indicated at a decision block 606. The source transport layer TLO fragments the super packet into multiple packets and sends all packets of a super packet only responsive to the credit request being granted by the destination transport layer TLI that is needed to send all packets of the super packet.

As indicated at a block 608, the source transport layer TLO tags a first packet with a total size of the super packet, assigns ETE sequence numbers, and tags a last packet with a tail flag, sending all packets of the super packet to the destination transport layer. As indicated at a block 610, the destination transport layer receives the packets, buffers, and restores order of the received packets using ETE sequence numbers, checking for the last packet with the tail flag and all packets in the super packet as indicated at a decision block 612. The destination transport layer transfers all packets of the super packet to the destination device only responsive to receiving all packets in the super packet as indicated at a block 614. The destination transport layer grants credits that are used, and released by the source transport layer, or rescinded by the destination transport layer. Then the destination transport layer grants credits to other source TLOs so that each source transport layer receives a fair chance to make forward progress while credits are granted only for available receive buffer space and sufficient for at least one super packet. Then sequential operations continue as indicated at a block 616.

Figure 7:
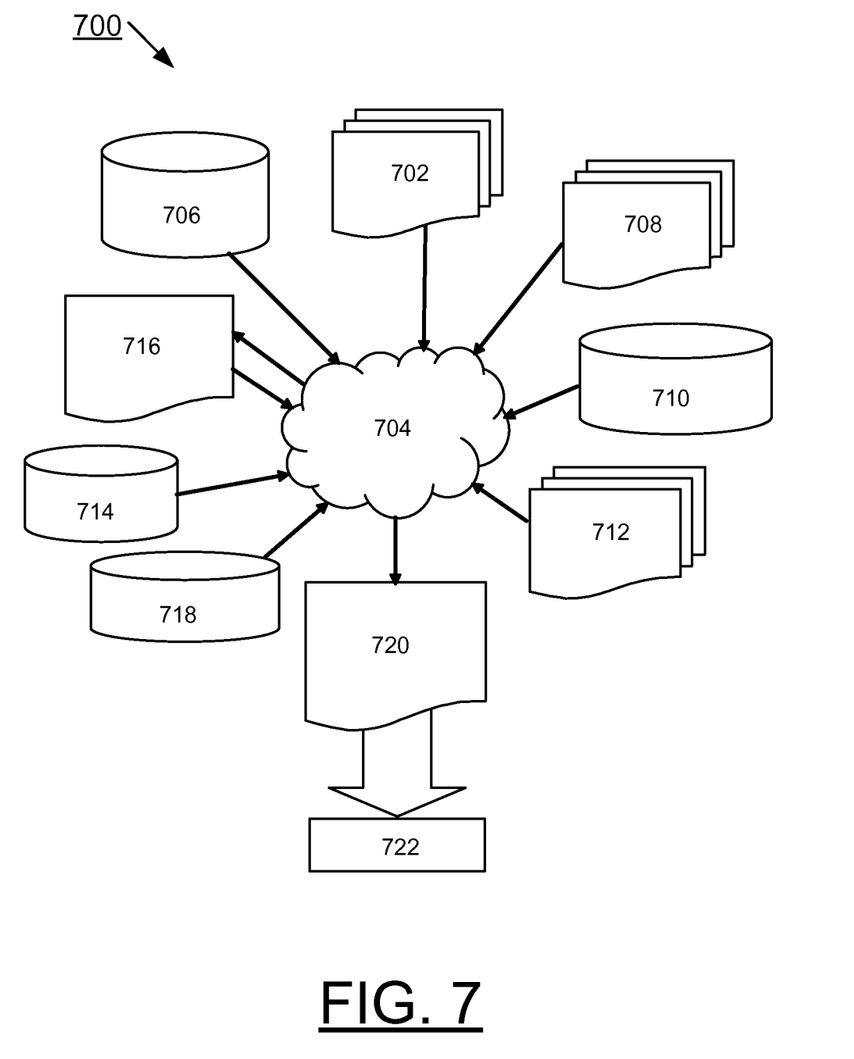
FIG. 7 is a flow diagram of a design process used in semiconductor design, manufacturing, and/or test.

FIG. 7 shows a block diagram of an example design flow 700 that may be used for circuits 200, 300 and the interconnect chip 102 described herein. Design flow 700 may vary depending on the type of IC being designed. For example, a design flow 700 for building an application specific IC (ASIC) may differ from a design flow 700 for designing a standard component. Design structure 702 is preferably an input to a design process 704 and may come from an IP provider, a core developer, or other design company or may be generated by the operator of the design flow, or from other sources. Design structure 702 comprises circuits 102, 200, 300 in the form of schematics or HDL, a hardware-description language, for example, Verilog, VHDL, C, and the like. Design structure 702 may be contained on one or more machine readable medium. For example, design structure 702 may be a text file or a graphical representation of circuits 102, 200, 300. Design process 704 preferably synthesizes, or translates, circuits 102, 200, 300 into a netlist 706, where netlist 706 is, for example, a list of wires, transistors, logic gates, control circuits, I/O, models, etc. that describes the connections to other elements and circuits in an integrated circuit design and recorded on at least one of machine readable medium. This may be an iterative process in which netlist 706 is resynthesized one or more times depending on design specifications and parameters for the circuits.

Design process 704 may include using a variety of inputs; for example, inputs from library elements 708 which may house a set of commonly used elements, circuits, and devices, including models, layouts, and symbolic representations, for a given manufacturing technology, such as different technology nodes, 32 nm, 45 nm, 90 nm, and the like, design specifications 710, characterization data 712, verification data 714, design rules 716, and test data files 718, which may include test patterns and other testing information. Design process 704 may further include, for example, standard circuit design processes such as timing analysis, verification, design rule checking, place and route operations, and the like. One of ordinary skill in the art of integrated circuit design can appreciate the extent of possible electronic design automation tools and applications used in design process 704 without deviating from the scope and spirit of the invention. The design structure of the invention is not limited to any specific design flow.

Design process 704 preferably translates an embodiment of the invention as shown in FIGS. 1A-1E, 2, 3, 4, 5, and 6 along with any additional integrated circuit design or data (if applicable), into a second design structure 720. Design structure 720 resides on a storage medium in a data format used for the exchange of layout data of integrated circuits, for example, information stored in a GDSII (GDS2), GL1, OASIS, or any other suitable format for storing such design structures. Design structure 720 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1A-1E, 2, 3, 4, 5, and 6. Design structure 720 may then proceed to a stage 722 where, for example, design structure 720 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing end-to-end (ETE) credit management for enhanced large packet reassembly in an interconnect system, said method comprising:

providing a transport layer with a packet buffer to buffer a super packet and with a credit control to provide credit control for said super packet; said super packet being fragmented into a number N of smaller packets to be transferred in the interconnect system from a source device to a destination device;

a source transport layer, sending an End-to-End (ETE) credit request message to a destination transport layer for a super packet transmission to the destination device;

said request message requesting a credit increase for N credits;

said destination transport layer, granting said credit increase for N credits to allow the source device to send said super packet to the destination device responsive to available packet buffer space for packet reassembly of said fragmented super packet;

said source transport layer fragmenting said super packet into the number N of smaller packets and sending all packets of said fragmented super packet only responsive to the credit request being granted by said destination transport layer;

said destination transport layer receiving all packets of said fragmented super packet and reclaiming said credit increase, and said destination transport layer granting a credit increase to another of a plurality of source transport layers for providing a fair chance to each of the plurality of source transport layers to make forward progress.

2. The method as recited in claim 1 wherein said source transport layer sending all packets of said fragmented super packet includes said source transport layer tags a first packet with a total size of said super packet, assigns ETE sequence numbers, and tags a last packet with a tail flag, sending all packets of said fragmented super packet to said destination transport layer.

3. The method as recited in claim 1 wherein said destination transport layer receiving all packets of said fragmented super packet includes said destination transport layer receives said packets, buffers, and restores order of said received packets using ETE sequence numbers, checking for said last packet with said tail flag and checking for all packets in the super packet.

4. The method as recited in claim 3 includes said destination transport layer transfers all packets of the super packet to the destination device only responsive to receiving all packets in said super packet.

5. The method as recited in claim 1 includes said destination transport layer grants said credit increase to the source transport layer, and rescinds said credit increase to the source transport layer responsive to receiving all packets in said super packet or responsive to said source transport layer releasing said credit increase.

6. The method as recited in claim 5 wherein said destination transport layer selectively grants and rescinds said credit increase to another of said plurality source transport layers using a round robin granting of credit increases enabling each source transport layer to have a fair chance to make forward progress.

7. The method as recited in claim 6 wherein said destination transport layer selectively grants the credit increase to each said source transport layer for the super packet only with available receive buffer space.

8. A circuit for implementing end-to-end (ETE) credit management for enhanced large packet reassembly in an interconnect system comprising:
a transport layer including a packet buffer to buffer a super packet and including a credit control to provide credit control for said super packet; said super packet being fragmented into a number N of smaller packets to be transferred in the interconnect system from a source device to a destination device;
a source transport layer, sending an End-to-End (ETE) credit request message to a destination transport layer for a super packet transmission to the destination device;
said credit request message requesting a credit increase for N credits;
said destination transport layer, granting said credit increase for N credits to allow the source device to send said super packet to the destination device responsive to available packet buffer space for packet reassembly of said fragmented super packet;
said source transport layer fragmenting said super packet into the number N of smaller packets and sending all packets of said fragmented super packet only responsive to the credit request being granted by said destination transport layer;
said destination transport layer receiving all packets of said fragmented super packet and reclaiming said credit increase, and said destination transport layer granting a credit increase to another of a plurality of source transport layers for providing a fair chance to each of the plurality of source transport layers to make forward progress.

9. The circuit as recited in claim 8 wherein said source transport layer fragmenting said super packet into the number N of smaller packets and sending all packets of said fragmented super packet includes said source transport layer tags a first packet with a total size of said super packet, assigns ETE sequence numbers, and tags a last packet with a tail flag, sending all packets of said super packet to said destination transport layer.

10. The circuit as recited in claim 9 wherein said destination transport layer receiving all packets of said fragmented super packet includes said destination transport layer receives said packets, buffers, and restores order of said received packets using ETE sequence numbers, checking for said last packet with said tail flag and checking for all packets in the super packet.

11. The circuit as recited in claim 10 wherein said destination transport layer transfers all packets of the super packet to the destination device only responsive to receiving all packets in said super packet.

12. The circuit as recited in claim 8 wherein said destination transport layer grants said credit increase to said source transport layer for said super packet only with available receive buffer space, and rescinds said credit increase to the source transport layer responsive to receiving all packets in said super packet or responsive to said source transport layer releasing said credit increase.

13. The circuit as recited in claim 12 wherein said destination transport layer selectively grants and rescinds said credit increase to another of said plurality source transport layers using a round robin granting of credit increases enabling each source transport layer to have a fair chance to make forward progress.

14. A multiple-path local rack interconnect system comprising:
a plurality of interconnect chips;
a plurality of serial links connected between each of said plurality of interconnect chips; each of said interconnect chips including a transport layer including a packet buffer to buffer a super packet and including a credit control to provide credit control for said super packet;
said super packet being fragmented into a number N of smaller packets to be transferred in the interconnect system from a source device to a destination device;
a source transport layer, sending an End-to-End (ETE) credit request message to a destination transport layer for a super packet transmission to the destination device;
said credit request message requesting a credit increase for N credits;
said destination transport layer, granting said credit increase for N credits to allow the source device to send said super packet to the destination device responsive to available packet buffer space for packet reassembly of said fragmented super packet;
said source transport layer fragmenting said super packet into the number N of smaller packets and sending all packets of said fragmented super packet only responsive to the credit request being granted by said destination transport layer;
said destination transport layer receiving all packets of said fragmented super packet and reclaiming said credit increase, and said destination transport layer granting a credit increase to another of a plurality of source transport layers for providing a fair chance to each of the plurality of source transport layers to make forward progress.

15. The multiple-path local rack interconnect system as recited in claim 14 wherein said source transport layer fragmenting said super packet into the number N of smaller packets and sending all packets of said fragmented super packet includes said source transport layer tags a first packet with a total size of said super packet, assigns ETE sequence numbers, and tags a last packet with a tail flag, sending all packets of said super packet to said destination transport layer.

16. The multiple-path local rack interconnect system as recited in claim 15 wherein said destination transport layer receiving all packets of said fragmented super packet includes said destination transport layer receives said packets, buffers, and restores order of said received packets using ETE sequence numbers, checking for said last packet with said tail flag and checking for all packets in said super packet.

17. The multiple-path local rack interconnect system as recited in claim 14 wherein said destination transport layer transfers all packets of said super packet to the destination device only responsive to receiving all packets in said super packet.

18. The multiple-path local rack interconnect system as recited in claim 14 wherein said destination transport layer grants said credit increase to said source transport layer for said super packet only with available receive buffer space, and rescinds said credit increase to the source transport layer responsive to receiving all packets in said super packet or responsive to said source transport layer releasing said credit increase; and said destination transport layer selectively grants and rescinds said credit increase to another of said plurality source transport layers using a round robin granting of credit increases enabling each source transport layer to have a fair chance to make forward progress.

19. A design structure embodied in a non-transitory machine readable medium used in a design process, the design structure comprising:
   a circuit tangibly embodied in the non-transitory machine readable medium used in the design process, said circuit for implementing end-to-end (ETE) credit management for enhanced large packet reassembly in an interconnect system, said circuit comprising:
      a transport layer including a packet buffer to buffer a super packet and including a credit control to provide credit control for a said super packet; said super packet being fragmented into a number N of smaller packets to be transferred in the interconnect system from a source device to a destination device;
      a source transport layer, sending an End-to-End (ETE) credit request message to a destination transport layer for a super packet transmission to the destination device;
      said credit request message requesting a credit increase for N credits;
      said destination transport layer, granting said credit increase for N credits to allow the source device to send said super packet to the destination device responsive to available packet buffer space for packet reassembly of said fragmented super packet;
      said source transport layer fragmenting said super packet into the number N of smaller packets and sending all packets of said fragmented super packet only responsive to the credit request being granted by said destination transport layer;
      said destination transport layer receiving all packets of said fragmented super packet and reclaiming said credit increase, and said destination transport layer granting a credit increase to another of a plurality of source transport layers for providing a fair chance to each of the plurality of source transport layers to make forward progress,
      wherein the design structure, when read and used in the manufacture of a semiconductor chip produces a chip comprising said circuit.

20. The design structure of claim 19, wherein the design structure comprises a netlist, which describes said circuit.

21. The design structure of claim 19, wherein the design structure resides on storage medium as a data format used for the exchange of layout data of integrated circuits.

22. The design structure of claim 19, wherein the design structure includes at least one of test data files, characterization data, verification data, or design specifications.

23. The design structure of claim 19, wherein said source transport layer fragmenting said super packet into the number N of smaller packets and sending all packets of said fragmented super packet includes said source transport layer tags a first packet with a total size of said super packet, assigns ETE sequence numbers, and tags a last packet with a tail flag, sending all packets of said super packet to said destination transport layer.

24. The design structure of claim 23, wherein said destination transport layer receiving all packets of said fragmented super packet includes said destination transport layer receives said packets, buffers, and restores order of said received packets using ETE sequence numbers, checking for said last packet with said tail flag and checking for all packets in the super packet; and said destination transport layer transfers all packets of the super packet to the destination device only responsive to receiving all packets in said super packet.

* * * * *